(12) United States Patent
Wong et al.

(10) Patent No.: US 8,698,912 B2
(45) Date of Patent: Apr. 15, 2014

(54) METHODS, APPARATUS AND SYSTEMS FOR DETERMINING POWER SPECTRAL DENSITY OF A SIGNAL VIA MODULATION OF THE SIGNAL

(75) Inventors: Wesley Philip Wong, Cambridge, MA (US); Kenneth Anders Halvorsen, Natick, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 404 days.

(21) Appl. No.: 13/057,623

(22) PCT Filed: Aug. 5, 2009

(86) PCT No.: PCT/US2009/004498
§ 371 (c)(1),
(2), (4) Date: Apr. 20, 2011

(87) PCT Pub. No.: WO2010/016906
PCT Pub. Date: Feb. 11, 2010

(65) Prior Publication Data
US 2011/0193987 A1 Aug. 11, 2011

Related U.S. Application Data

(60) Provisional application No. 61/086,336, filed on Aug. 5, 2008.

(51) Int. Cl.
*H04N 5/225* (2006.01)
(52) U.S. Cl.
USPC .................. 348/222.1; 348/E5.024; 382/100; 382/103; 382/168
(58) Field of Classification Search
None
See application file for complete search history.

(56) References Cited

U.S. PATENT DOCUMENTS

| | | | |
|---|---|---|---|
| 5,744,710 A * | 4/1998 | Abatzoglou et al. | 73/170.11 |
| 5,841,911 A * | 11/1998 | Kopeika et al. | 382/254 |
| 6,051,422 A | 4/2000 | Kovacs et al. | |
| 7,317,748 B2 * | 1/2008 | Lehmann et al. | 375/138 |
| 2001/0033576 A1 * | 10/2001 | Richards | 370/442 |
| 2003/0173976 A1 | 9/2003 | Wiegand et al. | |

(Continued)

OTHER PUBLICATIONS

Barrett Harrison H et al., "Spectral Analysis", "Foundations of Image Science", 2004, Section 8.2.5.*

(Continued)

*Primary Examiner* — Christopher S Kelley
*Assistant Examiner* — Kaitlin A Retallick
(74) *Attorney, Agent, or Firm* — Wolf, Greenfield & Sacks, P.C.

(57) ABSTRACT

Methods, apparatus and systems for determining a power spectral density (PSD) of a signal, in which modulation of the signal is employed to facilitate determination of one or more PSD values over a wide range of frequencies. In some implementations, the signal may represent a wide-sense stationary random process. In one example, the signal is measured/sampled during a plurality of measurement windows, during which an intensity of the signal is modulated at one or more modulation frequencies. A variance of a set of quantities determined from the signal samples is calculated and used to determine respective values of the power spectral density (PSD) for the signal at the one or more modulation frequencies. The one or more modulation frequencies may be chosen in excess of the Nyquist frequency of the sampling process, such that the signal may be characterized for one or more frequencies above the Nyquist limit.

4 Claims, 8 Drawing Sheets

(56) References Cited

U.S. PATENT DOCUMENTS

| | | | |
|---|---|---|---|
| 2004/0190596 A1* | 9/2004 | Lehmann et al. | 375/138 |
| 2007/0297543 A1* | 12/2007 | Spiridon et al. | 375/345 |
| 2008/0151694 A1* | 6/2008 | Slater | 367/178 |
| 2011/0013002 A1* | 1/2011 | Thompson et al. | 348/77 |
| 2011/0092177 A1* | 4/2011 | Sorrells et al. | 455/323 |

OTHER PUBLICATIONS

Wesley Wong and Ken Halvorsen, "The Effect of Integration Time on Fluctuation Measurements: Calibrating an Optical Trap in the Presence of Motion Blur", Optics Express, vol. 14, No. 25, Dec. 11, 2006.*

Weiming Yu, William W. Mantulin, and Enrico Gratton, "Fluorescence Lifetime Imaging: New Microscopy Technologies", Emerging Tools for Single-Cell Analysis: Advances in Optical Measurement Technologies, 2000.*

Barrett Harrison et al., "8.2.5 Spectral Analysis," in "8.2 Random Processes," *Foundations of Image Science*, John Wiley & Sons, Hoboken, NJ, 2004, pp. 389-393.

Berg-Sörensen et al., "Power spectrum analysis for optical tweezers," *Rev Scientific Instruments, AIP*, 75(3):594-612, Melville, NY, USA, Mar. 1, 2004.

Crocker et al., "Methods of Digital Video Microscopy for Colloidal Studies," *J Colloid and Interface Science*, 179:298(1)-310(13), Academic Press, NY, USA, Jan. 1, 1996.

International Search Report and Written Opinion for PCT/US2009/004498 mailed Dec. 28, 2009.

Jose et al., "On-Chip Spectrum Analyzer for Analog Built-In Self Test," VLSI Test Symposium, 2005, *Proc. 23rd IEEE*, Palm Springs, CA, USA, May 1, 2005, pp. 131-136.

Liapine, A., "Cavity BPM Tutorial," NANOBPM Meeting, Mar. 2005, High Energy Accelerator Research Organization, Japan, pp. 1-11.

Neuman et al., "Optical trapping," *Review of Scientific Instruments, AIP*, 75(9):2787-2809 2004, Melville, NY, US.

Suzuki et al., "Disturbance-Free High-Speed Sinusoidal Phase-Modulating Laser Diode Interferometer," *Applied Optics* 41(10):1949-1953, Apr. 1, 2002, Optical Society of America, Washington, D.C., US.

Van Munster et al., "phiFLIM: a new method to avoid aliasing in frequency-domain fluorescence lifetime imaging microscopy," *J Microscopy* 213(1):29-38 2004.

Voparil R., "X-ray non-dispersive spectral analysis using modulated radiation," *J Physics E. Scientific Insruments*, 3(10):798-800, IOP Publishing, Bristol, England, Oct. 1, 1970.

Wong et al., "The effect of integration time on fluctuation measurements: calibrating an optical trap in the presence of motion blur,"*Optics Express*, 14(25):12517-12531 Dec. 11, 2006.

Wong et al., "Beyond the frame rate: measuring high-frequency fluctuations with lightintensity modulation," *Optics Letters* 34(3):277-279, Optical Society of America, Washington, D.C., US, Feb. 1, 2009.

Yu et al., "Fluorescence Lifetime Imaging: New Microscopy Technologies," Ch. 7, *Emerging Tools for Single-Cell Analysis: Advances in Optical Measurement Technologies*, eds. Gary Durack & J. Paul Robinson, Wiley-Liss, Inc., 2000, pp. 139-173.

Zverev et al., "Spectral analysis in acoustics, optics, and radiophysics using the modulation method," *Radiophysics and Quantum Electronics*, 10(9-10):731-739, Springer New York LLC, US, Sep. 1, 1967.

* cited by examiner

METHODS, APPARATUS AND SYSTEMS FOR DETERMINING POWER SPECTRAL DENSITY OF A SIGNAL VIA MODULATION OF THE SIGNAL

RELATED APPLICATIONS

This Application is a National Stage application of PCT/US2009/004498 filed Aug. 5, 2009, which claims the benefit under 35 U.S.C. §119(e) of U.S. Provisional Application Serial No. 61/086,336, filed on Aug. 5, 2008 and entitled "METHODS, APPARATUS AND SYSTEMS FOR DETERMINING POWER SPECTRAL DENSITY OF A SIGNAL VIA MODULATION OF THE SIGNAL".

BACKGROUND

A signal is a potentially varying quantity that can carry information. Some types of signals are waves (e.g., electromagnetic waves, acoustic waves, fluid waves), and accordingly various types of signals include, but are not limited to, electrical signals, optical signals, acoustic signals, pressure signals, and fluid signals. Fluctuations of one or more aspects of a signal generally arise from one or more changes or perturbations in an environment or medium in which the signal is generated and/or propagates. Such signal fluctuations in some instances represent noise and in other instances represent information carried by the signal. Many types of signals may be characterized by their frequency content, i.e., the amount of energy present in the signal at one or more frequencies. This type of characterization is commonly referred to in the relevant arts as a "power spectral density" (PSD) or simply "spectrum" of the signal (e.g., having dimension of Watts/Hz for a voltage signal). The PSD of a signal generally provides valuable insight as to the nature of the information carried by the signal and/or signal noise.

Some types of signals represent "deterministic" processes, in which essentially no randomness is involved in the signal fluctuations. Other types of signals, however, represent random or "stochastic" processes in which the evolution of signal fluctuations over time involves some indeterminacy. Some familiar examples of random processes include: stock market fluctuations; speech, audio or video; and Brownian motion (random movement of particles suspended in a liquid or gas). For a signal representing a random process, the power spectral density of the signal captures the frequency content and thereby helps to identify time correlations or other features in the signal relating to the underlying process. In this manner, the PSD provides a useful way to characterize signal fluctuations representing random processes, including noise and/or information, and in many instances facilitates interpretation of information carried by the signal.

In many practical applications, a given signal is measured or "sampled" via some type of signal detector (e.g., an electrical, optical, or acoustic/pressure detector) over some finite period of time to facilitate signal processing and analysis (e.g., to recover the information carried by the signal). A "sample" of a signal refers to a value or a set of values that is acquired/measured at a particular point in time and/or during a particular interval or window of time. The "sampling frequency" or sampling rate is the number of samples obtained in one second, and the "sampling interval" is the reciprocal of the sampling frequency. The "exposure time" refers to the duration of a given interval or measurement window of time over which one or more values constituting a sample are obtained (i.e., a duration of a measurement window). Thus, for measurement windows that do not overlap in time, the sampling frequency is limited to frequencies at or below the inverse of the exposure time.

The "Nyquist-Shannon" sampling theorem provides a sufficient condition under which reconstruction of a signal from its samples is possible; namely, a band-limited signal having frequency content at some maximum frequency can be reconstructed perfectly if the sampling rate is more than twice the maximum frequency. The frequency equal to one-half the sampling rate is referred to as the "Nyquist frequency" or "Nyquist limit." From the Nyquist-Shannon theorem, it should be appreciated that the Nyquist limit establishes a conventional bound on the bandwidth of a signal that can be reconstructed/recovered. Accordingly, the Nyquist limit also places constraints on the characterization of signal fluctuations (and the integrity of information) that may be reliably derived from a sampled signal. Further, if the bandwidth of the signal is in excess of the Nyquist limit, a phenomenon commonly referred to as "aliasing" occurs, thereby vitiating the reconstructed/recovered signal.

One of many areas of interest involving random processes and the characterization of signals representing such processes relates to thermal and/or chemical fluctuations associated with microparticles (e.g., molecules, bacteria, colloidal particles, cells). Such microparticles are more generally referred to hereinafter as "objects," and movements or vibrations of a given object constituting thermal and/or chemical fluctuations are referred to generally as "activity" of the object. The activity of some exemplary microparticles, when optically trapped, has been characterized in the relevant literature as a wide-sense stationary random process, i.e., a random process whose mean and variance do not change over time.

One conventional technique for acquiring signals representing such processes involves particle/object tracking and imaging via video microscopy. According to this technique, an object of interest may be irradiated with radiation (e.g., while confined in an optical trap). In some examples, at least a portion of the radiation is reflected from or transmitted through the object, whereas in other examples the radiation may otherwise interact with the object such that the object itself is an emission source (e.g., the object is stimulated by the incident radiation and as a result itself emits radiation as fluorescence). For purposes of the present disclosure, radiation reflected from, transmitted through, or otherwise emitted by the object all are referred to generally as "radiation from the object." Radiation from the object optionally may pass through one or more microscope objectives for appropriate magnification, and ultimately impinges on a detector (e.g., an image acquisition device such as a conventional video camera). As the object moves or vibrates while irradiated, the object's motion (i.e., activity) is captured by the video camera. Thus, the radiation from the object and affected by the object's movement constitutes a signal representing a random process (i.e., fluctuations in the object's position), and this signal is sampled by the video camera by virtue of the successive frames of acquired images of the irradiated object.

One challenge presented by this approach is that the video camera acquires images of the object (i.e., samples of the signal) at a sampling rate (e.g., typically around 30 Hz) that is often significantly lower than the rate or rates at which the object may be moving or vibrating; stated differently, standard video camera rates on the order of approximately 30 Hz typically are far lower than the fluctuation frequency of many phenomena of interest. For example, the characteristic timescale for free diffusion of a nanometer/biomolecular-sized object is on the order of nanoseconds (frequencies on the order of gigahertz or GHz). More complex biomolecular processes may be significantly slower, but still faster than standard video rates (e.g., an exemplary bacterial DNA transcription rate is on the order of about 1 kHz).

While faster cameras are available, at increasing expense, it should be appreciated that the intensity of the radiation impinging on the video camera that is required for suitable imaging is inversely proportionally to the exposure time (i.e., duration of a measurement window). Thus, employing a faster video camera with a higher sampling rate and a correspondingly decreased exposure time generally requires significantly higher radiation intensity, which may in turn limit the camera's suitability for many low-light intensity measurement applications (e.g., such as single-molecule fluorescence). The exposure time of a video camera may also affect the camera's frequency response, limiting the frequency up to which fluctuation measurements may be taken. Furthermore, the detectors themselves generally have a frequency response that significantly attenuates at higher frequencies, further reducing the ability of the camera to capture high frequency information (e.g., associated with random processes occurring on a relatively fast timescale). The frequency response of a detector depends on its design and may vary significantly with factors such as wavelength and intensity of the detected radiation. Accordingly, both the sampling frequency/rate of the video camera (which establishes the Nyquist limit) and the frequency response of the camera's detectors place significant constraints on the ability to recover from the sampled signal information that may be associated with frequencies higher than the Nyquist limit and/or the frequency response of the camera's detectors. As such, the power spectral density (PSD) of the sampled signal has an upper frequency bound set by the lower of the Nyquist limit and the detector frequency response.

Recent research efforts relating to thermal and/or chemical fluctuations associated with microparticles have been directed to developing a video microscopy technique to measure the PSD of such a sampled signal above the Nyquist limit in particular circumstances in which a general functional form of the PSD is known a priori. This technique is described in "The effect of integration time on fluctuation measurements: calibrating an optical trap in the presence of motion blur," by W. Wong and K. Halvorsen, Optics Express, December 2006, Vol. 14, No. 25, 12517, which publication is hereby incorporated herein by reference in its entirety. In this publication, the technique is illustrated using video imaging to characterize the movement/vibrations of a confined particle (e.g., microsphere in an optical trap) at frequencies above the Nyquist limit (which is set by the sampling rate of the video camera used to acquire images of an irradiated particle). Again, this technique requires that the general functional form of the PSD is known a priori, as set forth below.

As noted above, practical acquisition devices collect data (e.g., sample a signal) over a finite exposure time (i.e., duration of a measurement window). In the exemplary video microscopy application discussed above, the radiation from the moving/vibrating object constitutes a signal X(t) representing a wide-sense stationary random process associated with the activity of the object (i.e., the changing position of the object as a function of time). In the simplest case, a sample $X_m(t)$ of the signal is the time average of its true value X(t) over the exposure time W:

$$X_m(t) = \frac{1}{W} \int_{t-W/2}^{t+W/2} X(t') dt'. \tag{1}$$

Eq. 1 represents a phenomenon commonly referred to in the relevant arts as the "integration effect" or "aperture effect." Here the timestamp, t, is defined as the average time in the measurement window. In the example of video imaging, averaging leads to the common problem of video image blur, in which object motion during the measurement window often causes errors in the signal sample $X_m$ (i.e., the sampled position of the object). Image blur increases the measurement uncertainty and adds systematic biases to the measured values, thereby distorting the frequency content of the signal being sampled. Generally, as noted above, frequency information associated with the sampled signal is reliable only for frequencies below the lower of the Nyquist limit and the maximum frequency response of the sampling device (e.g., the radiation detectors of the video camera), and for sufficiently short exposure times W that render the aperture effect essentially negligible.

The PSD of the actual signal X(t) (representing a real-valued trajectory for a wide-sense stationary random process) is defined as the Fourier transform of the auto-correlation function. For a wide-sense stationary random process the auto-correlation function of X is solely a function of the time shift, τ:

$$R_{XX}(\tau) = \langle X(t)X(t+\tau) \rangle \tag{2}$$

where the angle brackets ⟨ ... ⟩ represent an ensemble average. The PSD is therefore given by:

$$P(\omega) \equiv \tilde{R}_{XX}(\omega). \tag{3}$$

The tilde is used to designate the Fourier transform, $\tilde{X}(\omega) = \int X(t)\exp(-i\omega t)dt$. The integral is taken over the entire integration domain (e.g., from −∞ to +∞) unless otherwise specified.

Due to the integration or aperture effect, which leads to image blur as noted above, the PSD derived from the sampled signal $P_m(\omega)$ differs from the PSD $P(\omega)$ of the actual signal. The difference may be quantified by first expressing the signal sample $X_m(t)$ as a convolution with an "impulse response" in the form of a rectangular function representing the measurement window:

$$X_m(t) = (X*H)(t) \equiv \int X(t')H(t-t')dt', \tag{4}$$

where H(t) is the impulse response (i.e., rectangular function):

$$H(t) = \begin{cases} \dfrac{1}{W} & -W/2 < t \le W/2 \\ 0 & \text{elsewhere.} \end{cases} \tag{5}$$

This is equivalent to the time integral in Eq. 1. Eq. 2 and Eq. 4 may then be employed to determine the autocorrelation function of $X_m$, namely $R_{X_m X_m}$, from which the PSD of the sampled signal, $P_m(\omega)$, is given by:

$$P_m(\omega) \equiv \tilde{R}_{X_m X_m}(\omega). \tag{6}$$

Equivalently, the PSD of the sampled signal may be expressed in terms of the PSD of the actual signal P(ω) and the Fourier transform of the rectangular impulse response representing the measurement window, according to:

$$P_m(\omega) = P(\omega)|\tilde{H}(\omega)|^2. \tag{7}$$

While the direct measurement of $P_m(\omega)$ may be made up to the Nyquist frequency, the variance effectively integrates over all frequencies:

$$\text{var}[X_m](W) = \frac{1}{2\pi} \int P_m(\omega) d\omega \quad (8)$$

$$= \frac{1}{2\pi} \int P^{R_i}(\omega) |\tilde{H}^W(\omega)|^2 d\omega. \quad (9)$$

Superscripts have been added in Eq. 9 to explicitly indicate that $\tilde{H}$ is a function of the exposure time W, and P is a function of some physical parameters, $R_i$. The variance is written as a function of the exposure time, W, to further emphasize that if the form of $P^{R_i}(\omega)$ as a function of $R_i$ is known, then these parameters may be determined by measuring the variance at different values of W while keeping all the physical settings fixed, then performing a non-linear fit to $\text{var}[X_m](W)$ with $R_i$ as the fitting parameters.

As can be seen from Eq. 10 below, the detection bandwidth using this method is limited not by the sampling rate of the acquisition system, but rather by the maximum shutter speed 1/W (i.e., minimum exposure time) of the video camera.

$$|\tilde{H}^W(\omega)|^2 = \left(\frac{\sin(\omega W/2)}{\omega W/2}\right)^2 \quad (10)$$

In summary, determination of the power spectral density, $P^{R_i}(\omega)$, requires solving for the physical parameters defining the assumed functional form of $P^{R_i}(\omega)$. The functional form is not determined from this measurement, but may be known, for example, from a theoretical model for the process being measured. Solving for the physical parameters using the experimentally measured variances, $\text{var}[X_m](W)$, firmly defines the scale and shape of the power spectral density of the process for the specific experimental conditions. The accuracy of the power spectral density is dependent on an appropriate choice of the functional form of $P^{R_i}(\omega)$ and the stability of the process during measurements such that the defining physical parameters are constant.

SUMMARY

Applicants have recognized and appreciated that under many circumstances, the general functional form of a power spectral density (PSD) for a signal may be unknown a priori. As such, characterization of signals, including signals representing random processes as discussed in some examples above, may be limited to frequencies below the Nyquist limit established by a signal sampling/measurement device, and/or the frequency response of the sampling/measurement device.

In view of the foregoing, various inventive embodiments disclosed herein are directed to methods, apparatus and systems for measuring the power spectral density of a signal without necessarily requiring a priori knowledge of the power spectral density's general functional form. In various exemplary embodiments discussed below, such methods, apparatus and systems involve modulation of a signal of interest so as to ultimately determine a PSD of the signal at or near one or more modulation frequencies, which may be well in excess of the Nyquist limit and/or frequency response of a sampling/measurement device.

The methods, apparatus and systems discussed herein in various embodiments contemplate signals of all types (e.g., electrical, optical, acoustic/pressure, fluid) that may be deterministic or represent random processes, and particularly wide-sense stationary random processes, for which characterization is desired via a power spectral density at one or more frequencies and/or over some range of frequencies. In some illustrative embodiments, inventive methods, apparatus and systems disclosed herein are discussed in the context of an exemplary application in which thermal and/or chemical fluctuations of microparticles are characterized via video microscopy. More generally, as noted above, some signals representing random processes of interest may be characterized in terms of frequency content over an appreciably wide range, not necessarily limited by signal sampling rate or detection/measurement frequency response, via intensity modulation of the signal.

In sum, one embodiment of the present invention is directed to a method, comprising: A) modulating a first signal at a first modulation frequency to provide a modulated first signal; B) measuring the modulated first signal during a plurality of measurement windows to obtain a corresponding plurality of samples of the modulated first signal so as to generate a set of quantities associated with the signal; and C) determining at least one value of a power spectral density (PSD) for the signal at or near the first modulation frequency based at least in part on B).

In various aspects of this method, the first signal may represent a random process, such as a wide-sense stationary random process. In one aspect, modulating the first signal may include modulating an intensity of the first signal. In another aspect, each measurement window of the plurality of measurement windows has a same duration, and each sample of the plurality of samples is measured during a different measurement window of the plurality of measurement windows. Additionally, the duration of the measurement windows may be varied so as to vary a resolution bandwidth of the PSD at or near the first modulation frequency. The determination of the one or more values of the PSD at or near the first modulation frequency may first involve a determination of a variance of the set of quantities, wherein each sample includes a plurality of values of the modulated first signal, and wherein B) further comprises estimating, for each sample of the plurality of samples, one quantity of the set of quantities associated with the signal based at least in part on the plurality of values of the modulated first signal.

In yet another aspect of this method relating more specifically to optical signals, the first signal may include radiation from an object (e.g., radiation reflected from or transmitted through an object, or otherwise emitted by the object), wherein measuring the first signal comprises detecting the radiation during the plurality of measurement windows to obtain the plurality of samples. In this case, each sample of the plurality of samples includes an image of the object based on the detected radiation, and the image includes a plurality of pixel values. The method may further comprise estimating a position of the object in the image based on the plurality of pixel values, wherein the estimated position constitutes the one quantity of the set of quantities associated with the signal.

Another embodiment of the present invention is directed to an apparatus, comprising a modulator to modulate an intensity of a first signal at a first modulation frequency to provide a modulated first signal. The apparatus further comprises at least one controller to measure the modulated first signal during a plurality of measurement windows to obtain a corresponding plurality of samples of the modulated first signal so as to generate a set of quantities associated with the signal. The controller further determines at least one value of a power spectral density (PSD) for the signal at or near the first modulation frequency based at least in part on the set of quantities.

Another embodiment of the present invention is directed to a system for characterizing an activity of an object, the activity constituting a wide-sense stationary random process. The system of this embodiment comprises a radiation source to irradiate the object with first radiation during the activity so as to provide a first signal representing the wide-sense stationary random process, wherein the first signal includes second radiation from the object resulting from the first radiation that irradiates the object. The system further comprises a video camera to detect the second radiation during a plurality of measurement windows, the video camera thereby acquiring and storing a corresponding first plurality of images of the object during the activity. Each image of the first plurality of images represents a sample of the first signal and includes a plurality of pixel values corresponding to the detected second. The system further comprises a modulator to modulate the first signal at a first modulation frequency prior to the video camera storing the first plurality of images. The system also comprises at least one processor coupled to the video camera to process the first plurality of images so as to generate a set of positions of the object during the activity. More specifically, the processor determines one position of the set of positions for each image of the first plurality of images based at least in part on the plurality of pixel values for the image. The processor further determines a variance of the set of positions and, based on this variance, the processor ultimately determines at least one value of a power spectral density (PSD) for the wide-sense stationary random process at or near the first modulation frequency.

In various aspects of this system, the object may be a microparticle, and the microparticle may be confined in an optical trap.

In other aspects of this system, the modulator may be configured to modulate an intensity of the first radiation generated by the radiation source or the second radiation from the object so as to modulate the first signal at the first modulation frequency. Alternatively, the video camera may include a shutter to generate the plurality of measurement windows, and the modulator may be configured to modulate the shutter so as to modulate the first signal at the first modulation frequency. In yet another aspect, the video camera includes a detector array to detect the second radiation from the object during the plurality of measurement windows, wherein the detector array provides as an output a plurality of electric signals representing the plurality of pixel values. The modulator may be configured to modulate the plurality of electric signals output by the detector array, prior to the video camera storing the plurality of images, so as to modulate the first signal at the first modulation frequency.

In yet other aspects of this system, the video camera may be configured such that the measurement windows periodically occur (e.g., successively occur) at a first sampling frequency, and the modulator may configured such that the first modulation frequency is greater than half of the first sampling frequency, and/or greater than a cutoff frequency of the video camera's detector array.

In yet other aspects of this system, the video camera is configured to acquire and store at least a second plurality of images of the object during the activity, the modulator is configured to modulate the first signal at least a second modulation frequency prior to the video camera storing the second plurality of images, and the processor is configured to process the second plurality of images so as to generate a second set of positions of the object during the activity. More specifically, the processor determines one position of the second set of positions for each image of the second plurality of images based at least in part on the plurality of pixel values for the image, determines a second variance of the second set of positions and a second value for the power spectral density (PSD) of the wide-sense stationary random process at or near the second modulation frequency based at least in part on the second variance of the second set of positions. The foregoing process may be repeated at a plurality of different modulation frequencies to determine multiple values for the PSD of the wide-sense stationary random process over a range of frequencies.

In yet another aspect of this system, when multiple modulation frequencies are employed for intensity modulation of the first signal, the modulator may be configured to modulate the first signal at the first modulation frequency only during a first subset of the plurality of measurement windows, and modulate the first signal at the second modulation frequency only during a second subset of the plurality of measurement windows. Furthermore, the first subset and second subset of the plurality of measurement windows may be interleaved or occur in an alternating fashion. These concepts may be extended to additional modulation frequencies such that a succession of measurement windows may correspond to successive samples in which the first signal is modulated at a number of different frequencies.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings.

DETAILED DESCRIPTION

Figure 1:
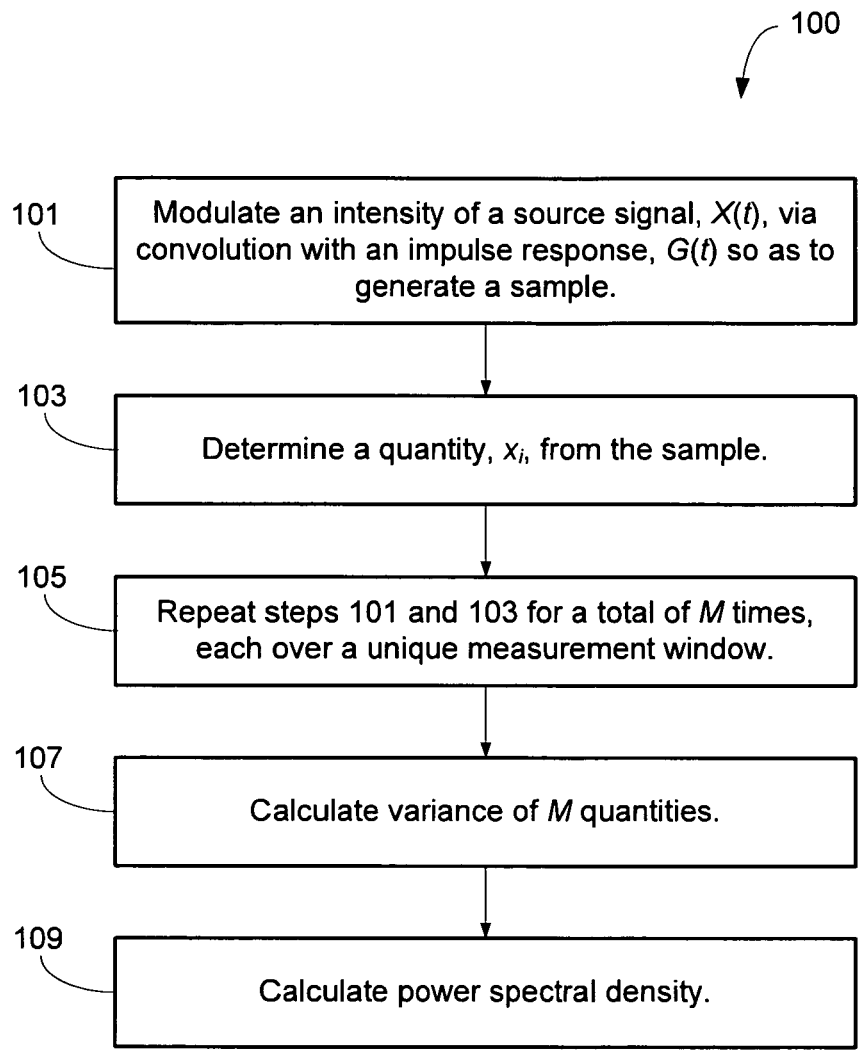
FIG. 1 is a flow chart illustrating a method for determining a power spectral density (PSD) of a signal.

There is substantial need in the sciences to accurately characterize various processes involving high-frequency fluctuations. The ability to perform accurate, high-frequency measurements of the power spectral density of such processes opens new opportunities for experimental exploration in a number of fields including, for example, single-molecule measurements, soft condensed matter physics, microrheology, florescence microscopy, and general video microscopy. At physiological temperatures, the functional and material properties of soft nano-to-microscale systems (e.g., proteins, membranes, DNA) are largely governed by their thermal and chemical fluctuations. Examples include the entropic elasticity of polymers such as DNA/RNA, the softness of biological membrane, and the procession of motor proteins. Yet, despite the pervasive need for accurate fluctuation measurements, the currently available techniques are limited in time resolution and often excessive in cost.

In view of the foregoing, the present disclosure is directed generally to inventive methods, apparatus and systems for determining power spectral density for a signal over a wide range of frequencies via modulation of the signal. In some exemplary implementations discussed herein, the signal may represent a random process, such as a wide-sense stationary random process, and modulation of the signal may include intensity modulation of the signal. Accordingly, in some inventive embodiments discussed herein, the process underlying such methods, apparatus and systems is referred to as "Intensity Modulated Spectral Analysis" (IMSA). In various exemplary implementations discussed in greater detail below, IMSA permits measurement of high-frequency fluctuations that may be in excess of the Nyquist limit and/or frequency response of a sensor/detector employed to measure/sample a signal representing the high-frequency fluctuations. Accordingly, in one aspect, the term "high-frequency" is used in the sense that frequencies of interest associated with the signal being measured may exceed the Nyquist limit of the acquisition device and/or the cutoff frequency of the acquisition device. Furthermore, limitations of the prior art requiring a priori knowledge of the general functional form of the power spectral density for a given signal are overcome via the methods, apparatus and systems described herein.

As discussed above, the methods, apparatus and systems disclosed herein in various embodiments contemplate signals of all types (e.g., electrical, optical, acoustic/pressure, fluid) that may be deterministic or represent random processes, and particularly wide-sense stationary random processes, for which characterization is desired via one or more values of a power spectral density at one or more frequencies and/or over some range of frequencies. In some illustrative embodiments discussed in greater detail below, inventive methods, apparatus and systems disclosed herein are presented in the context of an exemplary application in which thermal and/or chemical fluctuations of microparticles are characterized via video microscopy, wherein an object of interest is irradiated by a radiation source (e.g., light source). In one example, by modulating the intensity of the light source at a frequency of interest, the extent of positional fluctuations at that frequency may be determined from the measured variance in position, even if the modulation frequency is above the sampling frequency and/or the cutoff frequency of the acquisition device.

Following below are more detailed descriptions of various concepts related to, and embodiments of, inventive methods, apparatus and systems according to the present disclosure for determining power spectral density of a signal via modulation of the signal. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes only.

1. Mathematical Foundation

As discussed above in connection with prior research efforts relating to characterization of thermal and/or chemical fluctuations of microparticles, a signal acquisition device such as a video camera convolves a source signal X(t) (in this example, representing a random process) with an impulse response H(t), as given by Eq. 4. In the prior research efforts, the selection of an impulse response included a rectangular function representing a measurement window to model successive exposures of a video camera during imaging.

Applicants have appreciated that by convolving the source signal X(t) with an impulse response from a specific class of impulse responses, the power spectral density of the source signal may be determined without a priori knowledge of its functional form. Further, Applicants have identified a class of impulse responses with which the source signal may be convolved to accurately determine respective values of the power spectral density at a number of different frequencies over a virtually unlimited range of frequencies.

As noted above, the duration of the measurement window W of an acquisition device such as a video camera causes the source signal to be convolved with the rectangular impulse response, $\tilde{H}(\omega)$. As W becomes longer, $|\tilde{H}(\omega)|^2$ approaches an unnormalized Dirac delta function. Applicants have appreciated that the rectangular impulse response may be spectrally shifted to a frequency of interest, $\omega'$, such that it selects that frequency for measurement. In this section, a class of impulse responses, G(t), suitable for use in determining the power spectral density at or near discrete frequencies of interest is identified. The impulse response may be selected such that the power spectral density may be determined above the Nyquist frequency.

To shift the rectangular impulse response, H(t), defined by the duration of the measurement window, to the frequency of interest, $\omega'$, H(t) may be multiplied by a shifted sinusoidal function. This defines a class of functions, G(t)=L(t)H(t)/N, where $$L(t) = \sin(\omega' t + \phi) + B \quad (11)$$

and N is a normalization factor. The measured quantity, $X_m$, is $$X_m(t) = (X(t) * G(t)) = \frac{1}{N} \int X(t')H(t-t')L(t-t')dt'. \quad (12)$$

It is seen that the sinusoidal component of L(t) modulates the measured quantity X(t) at the frequency of interest, $\omega'$. The terms frequency of interest and modulation frequency are therefore used interchangably herein.

It is noted that the selection of G(t) that is convolved with the source signal may be limited by the acquisition device and the system being measured. For example, when imaging an object with a video camera (e.g., CCD/CMOS camera), the impulse response typically is a real, positively-valued function with a finite domain given by the cutoff imposed by the camera exposure time.

Without loss of generality, let B≥0. Setting $$N = \int H(t)L(t)dt \quad (13)$$

the convolution represents a weighted time average. When using this assignment the parameters (W, B) should be chosen such that N≠0. N=B whenever $\phi$ is an integer multiple of $2\pi$ (e.g. $\phi$=0), or whenever there are an integer number of oscillations within each measurement window (i.e., $\omega'$=n$2\pi$/W where n is a natural number).

The measured variance of the measured quantity is given by $$\text{var}[X_m] = \frac{1}{2\pi N^2} \int P(\omega) |\tilde{K}(\omega)|^2 d\omega \quad (14)$$

where $\tilde{K}(\omega)$ is the Fourier transform of L(t)H(t).

Initially, to find $\tilde{K}(\omega)$, the sine function is represented in terms of complex exponentials
The Fourier transform of L(t) is:

$$L(t) = \frac{e^{i\phi}e^{i\omega't} - e^{-i\phi}e^{-i\omega't}}{2i} + B \quad (15)$$

$$\tilde{L}(\omega) = i\pi e^{i\phi}\delta(\phi-\phi') + i\pi e^{-i\phi}\delta(\omega+\omega') + 2\pi B\delta(\omega) \quad (16)$$

where $\delta(\omega)$ is the Dirac delta function. As L(t) and H(t) are multiplied in the time domain, they are convolved (then divided by $2\pi$) in the frequency domain. Thus, the Fourier transform of L(t)H(t) is:

$$\tilde{K}(\omega) = -ie^{i\phi}\tilde{H}(\omega-\omega')/2 + ie^{i\omega}\tilde{H}(\omega'+\omega')/2 + B\tilde{H}(\omega) \quad (17)$$

The squared magnitude of this expression, after collecting terms is:

$$\tilde{K}(\omega) = |\tilde{H}(\omega+\omega')|^2/4 + |\tilde{H}(\omega-\omega')|^2/4 + \quad (18)$$
$$B^2|\tilde{H}(\omega)|^2 + B\sin(\phi)\tilde{H}(\omega)(\tilde{H}(\omega+\omega') + \tilde{H}(\omega-\omega')) -$$
$$\cos(2\phi)\tilde{H}(\omega+\omega')\tilde{H}(\omega-\omega')/2$$

Combining this result with Eq. 20 gives an expression for the measured variance:

$$(8\pi N^2)\text{var}[X_m] = \int P(\omega)|\tilde{H}(\omega+\omega')|^2 d\omega + \quad (19)$$
$$\int P(\omega)|\tilde{H}(\omega-\omega')|^2 d\omega + 4B^2 \int P(\omega)|\tilde{H}(\omega)|^2 d\omega +$$
$$4\sin(\phi)B \int P(\omega)\tilde{H}(\omega)(\tilde{H}(\omega+\omega') + \tilde{H}(\omega-\omega'))d\omega -$$
$$2\cos(2\phi) \int P(\omega)\tilde{H}(\omega+\omega')\tilde{H}(\omega-\omega')d\omega$$

For a real-valued wide-sense stationary random process, the power spectral density is an even function, i.e. $P(-\omega) = P(\omega)$. The expression for the measured variance then simplifies to:

$$\text{var}[X_m] = \frac{1}{4\pi N^2} \int P(\omega)|\tilde{H}(\omega-\omega')|^2 d\omega + \quad \text{(Term 1)} \quad (20)$$

$$\frac{B^2}{2\pi N^2} \int P(\omega)|\tilde{H}(\omega)|^2 d\omega + \quad \text{(Term 2)}$$

$$\frac{B\sin(\phi)}{\pi N^2} \int P(\omega)\tilde{H}(\omega)\tilde{H}(\omega-\omega')d\omega - \quad \text{(Term 3)}$$

$$\frac{\cos(2\phi)}{4\pi N^2} \int P(\omega)\tilde{H}(\omega+\omega')\tilde{H}(\omega-\omega')d\omega \quad \text{(Term 4)}$$

In term 1 of Eq. 20, as W gets longer, $|\tilde{H}(\omega-\omega')|^2$ approaches an unnormalized Dirac delta function centered about $\omega'$, and the value of the first term therefore approaches $\alpha P(\omega')$, where $$\alpha = \frac{1}{4\pi N^2} \int |\tilde{H}(\omega)|^2 d\omega \quad (21)$$
$$= \frac{1}{2WN^2}$$

Thus, term 1 provides the desired information about the power spectral density at the frequency of interest, $\omega'$. By accounting for the contributions from terms 2, 3, and 4, the power spectral density at the frequency of interest may be extracted from the measured variance.

In term 2 of Eq. 20, when B=0, the term vanishes. However, in many cases this is not practical, as for example when the impulse response cannot be negative (B≥1). When B≠0, the value of term 2 may be determined by measuring the variance with an unmodulated signal ($\omega'$=0), then multiplying this value by $B^2/N^2$. As noted earlier, when $\phi$=0 or when there are an integer number of oscillations within each measurement window, $B^2/N^2$=1.

Term 3 of Eq. 20 is a "cross-term" that is zero when B=0. When B is non-zero, this term can be set to zero by letting $\phi$=0 or any integer multiple of $\pi$. As term 3 depends on the overlap between two sinc-squared distributions that are separated by $\omega'$, it is small and can often be neglected when $\omega'$>>1/W.

Term 4 of Eq. 20 is the second "cross-term" which can be made zero by letting $\phi$=$\pi$/4+m$\pi$/2, where m is an integer. Like term 3, term 4 also becomes small as $\omega'$ becomes large relative to 1/W, and since term 4 is the overlap integral of sinc-squared distributions that are 2$\omega'$ apart rather than simply $\omega'$ apart, it approaches zero more quickly than term 3.

When the convolving function can take negative value, letting B=0 causes term 2 and term 3 to vanish. By choosing $\phi$ such that term 4 disappears, the measured variance is simply equal to term 1, as desired for measuring the power spectral density.

When B≠0, term 2 can be accounted for by making a non-oscillating (DC) measurement. Furthermore, the cross-terms 3 and 4 can be removed by properly selecting the phase $\phi$.

The cross-terms 3 and 4 disappear when the last two terms of Eq. 18 for $|\tilde{K}(\omega)|^2$ cancel each other out. In other words, when $$B\sin(\phi)\tilde{H}(\omega)(\tilde{H}(\omega+\omega')+\tilde{H}(\omega-\omega'))=\cos(2\phi)\tilde{H}(\omega+\omega')\tilde{H}(\omega-\omega')/2 \quad (22)$$

Rearranging and cancelling common factors gives $$\frac{\cos(2\phi)}{2B\sin(\phi)} = \tilde{H}(\omega)\left(\frac{1}{\tilde{H}(\omega-\omega')} + \frac{1}{\tilde{H}(\omega+\omega')}\right) \quad (23)$$

Choosing W such that there are an integer number of oscillations within the measurement window, i.e. $W=n2\pi/\omega'$, where n is a natural number, Eq. 23 is rearranged to:

$$\tilde{H}(\omega \pm \omega') = \frac{(-1)^n \tilde{H}(\omega) \omega W/2}{\omega W/2 \pm \omega' W/2} \quad (24)$$

Substituting this expression into Eq. 22 and cancelling common terms gives the simple expression $$\frac{\cos(2\phi)}{2B\sin(\phi)} = (-1)^n 2 \quad (25)$$

Using the double angle formula $\cos(2\phi)=1-2\sin^2(\phi)$ and applying the quadratic formula gives the solution:

$$\sin(\phi) = (-1)^{n+1} B \pm \sqrt{\frac{2B^2+1}{2}} \quad (26)$$

As $\sin(\phi)$ should be between −1 and 1, the solution with the smallest magnitude is chosen.

$$\sin(\phi) = (-1)^n \left(\sqrt{\frac{2B^2+1}{2}} - B\right) \quad (27)$$

Equivalently, an explicit expression for the phase which cancels the cross-terms 3 and 4 is:

$$\phi = (-1)^n \sin^{-1}\left(\sqrt{\frac{2B^2+1}{2}} - B\right) \quad (28)$$

This formula gives sensible values for all B≥0, as given above. Furthermore, when B=0 the principle branch of $\sin^{-1}$ gives $\phi=\pi/4$ as expected. In addition, in the limit as B becomes large $\phi$ approaches 0.

Letting $\phi=0$ and cancelling term 3 may be sufficient when term 4 is negligibly small. This typically occurs when $\omega'\gg 1/W$ (i.e. there are many cycles within each measurement window). In fact, if both cross-terms are so small that the phase, $\phi$, has a negligible effect on the measured variance, the oscillation does not even have to be properly synchronized with the measurement window—simply multiplying the input signal by the impulse response rather than convolving it can yield acceptable results.

To summarize, in order to measure the power spectral density of a signal at the frequency of interest, $\omega'$, the variance in the signal may be measured while modulating the intensity of the signal via convolution with $G(t)=H(t)L(t)/N$ as given in equations 5, 11, and 13. Writing the measured variance as $\text{var}[X_m](\omega')$, the power spectral density is given by the following formulas.

When B=0, $$P(\omega')=2WN^2\text{var}[X_m](\omega') \quad (29)$$

provided $\phi=\pi/4+m\pi/2$.

When B≠0 the desired power spectral density is given by:

$$P(\omega')=2WB^2(\text{var}[X_m](\omega')-\text{var}[X_m](0)) \quad (30)$$

provided that the duration of the measurement window, W, is chosen such that $W=n2\pi/\omega'$ where n is a natural number, and $\phi$ is chosen according to Eq. 28.

It should be appreciated that because the power spectral density measured according to Eq. 20, 29, or 30 is determined from the measured variance and not necessarily from a set of samples collected at a fixed sampling rate (e.g., as in conventional analog-to-digital conversion), the measurement is not subject to aliasing which occurs when the sampling rate is less than twice the bandwidth of the signal measured.

2. Implementation

The mathematical foundation demonstrates that the power spectral density may be characterized by modulating the intensity of a source signal. In one exemplary implementation, the source signal may represent a wide-sense stationary random process. Methods, apparatus, and systems are now presented to determine frequency information characterizing the source signal and/or an underlying process which it describes.

FIG. 1 provides method 100 for determining frequency information of a source signal, X(t). The source signal, X(t), may be any measureable quantity. In step 101, the intensity of a source signal, X(t), is modulated via convolution with a impulse response, G(t), so as to generate a sample. In some embodiments, the source signal is first modulated and then integrated over a measurement window to produce the sample. The impulse response, in one aspect, is defined by frequency of interest, $\omega'$, at which the frequency information of the source signal is to be determined. G(t) may equal H(t)L(t)/N, as in Eq. 12. The phase of L(t) may be chosen according to Eq. 28. In some embodiments, the phase, $\phi$, associated with G(t), may be ignored, and the source signal, X(t), and impulse signal, G(t), may be multiplied rather than convolved.

In step 103, a quantity, $x_i$, is determined from the sample. In some embodiments, the sample itself is the quantity, $x_i$, while in some other embodiments the sample must be processed to determine the quantity, $x_i$. For example, the sample may be an image of an object, while the quantity, $x_i$ is the position of the object to be determined from the image. The quantity $x_i$ is shown here as a scalar quantity, however, in some embodiments, $x_i$, may take an alternate form. For example, $x_i$ may be a vector quantity.

In step 105, steps 101 and 103 are repeated for a total of M times. Each time a sample is taken over a unique measurement window. This may be achieved, for example, by time shifting impulse response, G(t). In some embodiments, each measurement window is of the same duration. The measurement windows may be overlapping or non-overlapping. From each sample, a quantity, $x_i$ (i=1 to M), is determined.

The measured variance, $\text{var}[X_m]$, of the quantities, $x_i$, i=1 to M, is determined in step 107. The variance may be calculated as $$\text{var}[X_m](\omega') = \sum_{i=1}^{M} \frac{1}{M}(x_i - \mu)^2 \quad (31)$$

where M is the number of samples, $x_i$ is the value of the ith sample, and $\mu$ is the average value of the samples, $\mu=(x_1+x_2+\ldots+x_M)/M$. The variance is shown as a function of the frequency of interest to emphasize the effect of the selection of $\omega'$ in the impulse response and the frequency at which the power spectral density may be calculated in step 109. If, for example, the quantities are vectors, $\bar{x}_i$, $\text{var}[X_m](\omega')$ may be calculated for the magnitudes of the vectors, $\|\bar{x}_i\|$.

In step 109 the power spectral density is calculated at the frequency of interest, $\omega'$. The PSD may be calculated according to Eq. 20 using at least the variance, $\text{var}[X_m]$, determined in step 107. In some embodiments, the power spectral density may be estimated from Eq. 29 or Eq. 30.

The process may be repeated for a set of impulse responses, each for example, with a unique frequency of interest. In some embodiments, repetitions of the method 100 for a set of frequencies of interest are interspersed amongst each other.

Figure 2:
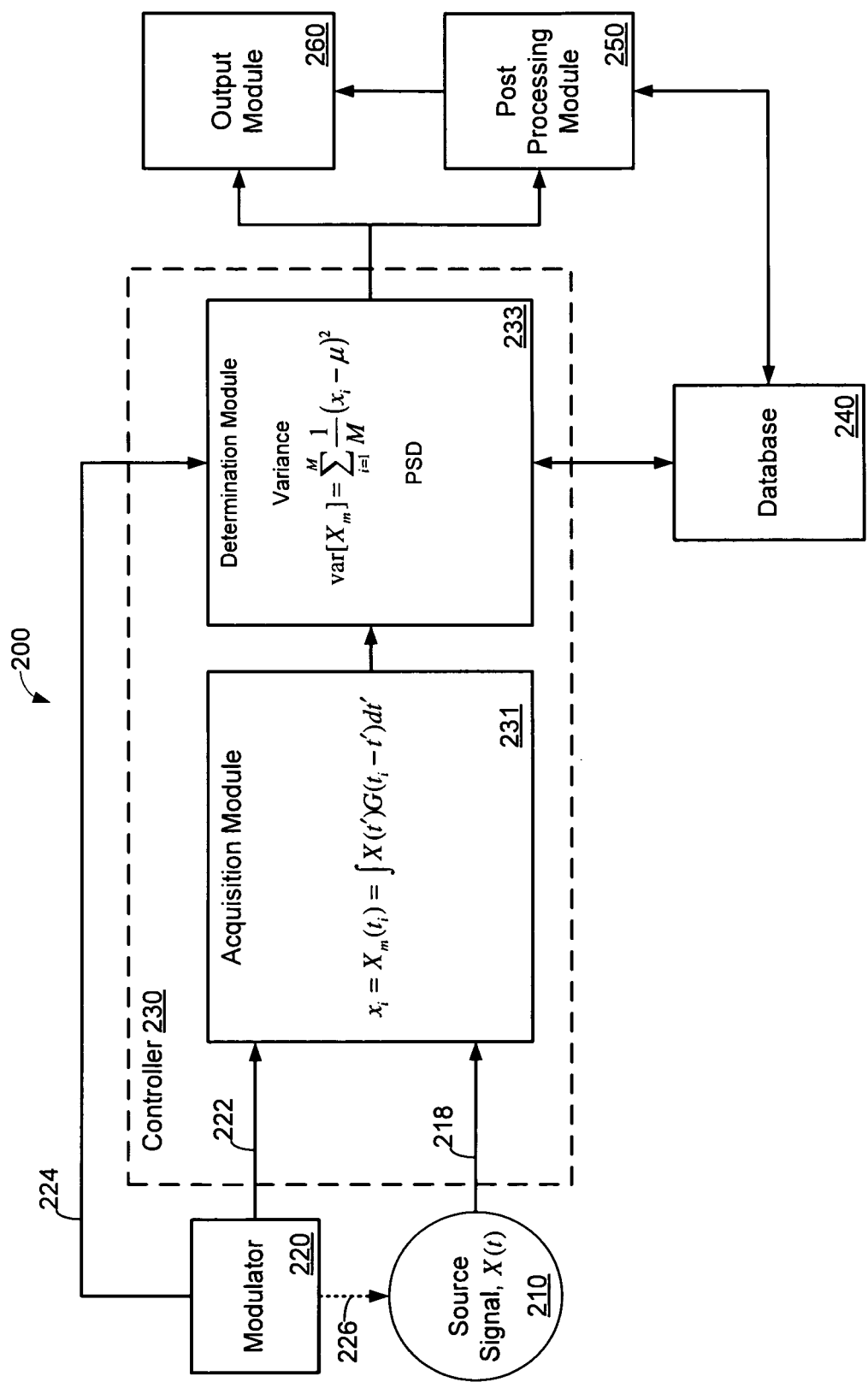
FIG. 2 is a block diagram of a measurement instrument according to some embodiments of the present invention.

FIG. 2 provides a block diagram of an apparatus 200 that may be employed as a measuring instrument for capturing frequency information of a source signal 210, X(t). Source signal 210 may be generated by a wide-sense stationary random process. In some embodiments, source signal 210 may be an electromagnetic signal (e.g., electrical, optical).

A modulator 220, modulates the intensity of the source signal 210 at a frequency of interest, $\omega'$, (i.e., the modulation frequency). The modulator 220 may do so by providing a modulation signal 222 to an acquisition module 231 of a controller 230 while the source signal 210 is collected by the acquisition module 231. The modulation signal 222 may be an impulse response, G(t). Any suitable impulse response may be used. For example, G(t) may comprise a sinusoidal term and a measurement window term Eq. 11.

In some embodiments, modulator 220 modulates source signal 210 prior to acquisition of the source signal 210 by the acquisition module 231 of the controller 230. For example, modulator 220 may include a modulated radiation source (not shown) which irradiates 226 an object (not shown) thus generating the source signal 210. The source signal is thus modulated reflected or transmitted radiation from the object. The acquisition module 231 of the controller 230 collects the modulated source signal (path 218). Modulation signal 222 may be optionally provided to the acquisition module 231.

When modulation signal 222 and source signal 210 are received by the acquisition module 231, the source signal 210 is modulated according to the modulation signal 222. The acquisition module 231 measures the modulated source signal. If, however, the source signal has already been modulated (e.g., via irradiation of an object with a modulated signal), the acquisition module 231 does not modulate the signal.

The acquisition module 231 accumulates the modulated source signal over the duration of a measurement window producing a sample. The measurement window may be defined by the modulation signal 222, or by the acquisition module 231. The sample may be a measurement of X(t), i.e., the quantity $X_m(t)$, or may be processed further to produce the quantity $X_m(t)$.

The acquisition module 231 may provide a functional implementation of Eq. 12 and outputs a series of M quantities, $X_m(t_i)$ or equivalently, $x_i$, for i=1 to M. Each quantity may be taken over a unique measurement window. The acquisition module 231 delivers these quantities, $x_i$, to the determination module 233 which may calculate the variance of the M quantities. The variance may be calculated according to Eq. 31.

The variance is related to the power spectral density at or near the modulation frequency when the source signal 210 is a wide-sense stationary random process. The PSD may be estimated by the determination module 233, for example, according to Eq. 20 using the variance, $\text{var}[X_m]$. In some embodiments, the power spectral density may be estimated from Eq. 29 or Eq. 30.

The determination module 233 may require additional information to calculate the PSD. The modulator 220 may provide information about the modulation signal, for example, via path 224. For example, modulator 220 may provide the modulation frequency (e.g., $\omega'$ in Eq. 11), the phase angle (e.g., $\phi$ in Eq. 11), an intensity offset (e.g., B in Eq. 11), and normalization factor, N, and other properties of the impulse response, G(t). A database 240 may store additional information for the determination module 233 to estimate the PSD. The database 240 may store a DC variance, that is, the variance of a set of quantities, $x_i$, measured when the modulation frequency is at or near 0 Hz. Information about the DC variance, the intensity offset, B, and the phase, $\phi$, may be used to account for terms 2, 3, and 4, in Eq. 20, such that the PSD may be determined.

Once the determination module 233 has determined an output value (e.g., $\text{var}[X_m]$ or $P(\omega')$), the output value may be displayed and/or plotted (e.g., through output module 260), stored in database 240, and/or provided to a post-processing module 250 for application of the value. For example, the measurement may be used to estimate the material properties of an object with which the source signal 210 is associated.

In some embodiments, modulator 220 may change the modulation frequency among a group of modulation frequencies after each measurement or a set of measurements. For example, a first measurement is taken at a first modulation frequency, a second at a second modulation frequency, and a third at a third modulation frequency. By cycling the modulation frequency used, the PSD may be determined at several frequencies of interest. Of course, the samples must be appropriately grouped based on modulation frequency before determining the variance and subsequently the PSD. Including measurement windows without modulation may be useful in determining the DC variance which is used in some embodiments to calculate the PSD (see Eq. 30).

Figure 3:
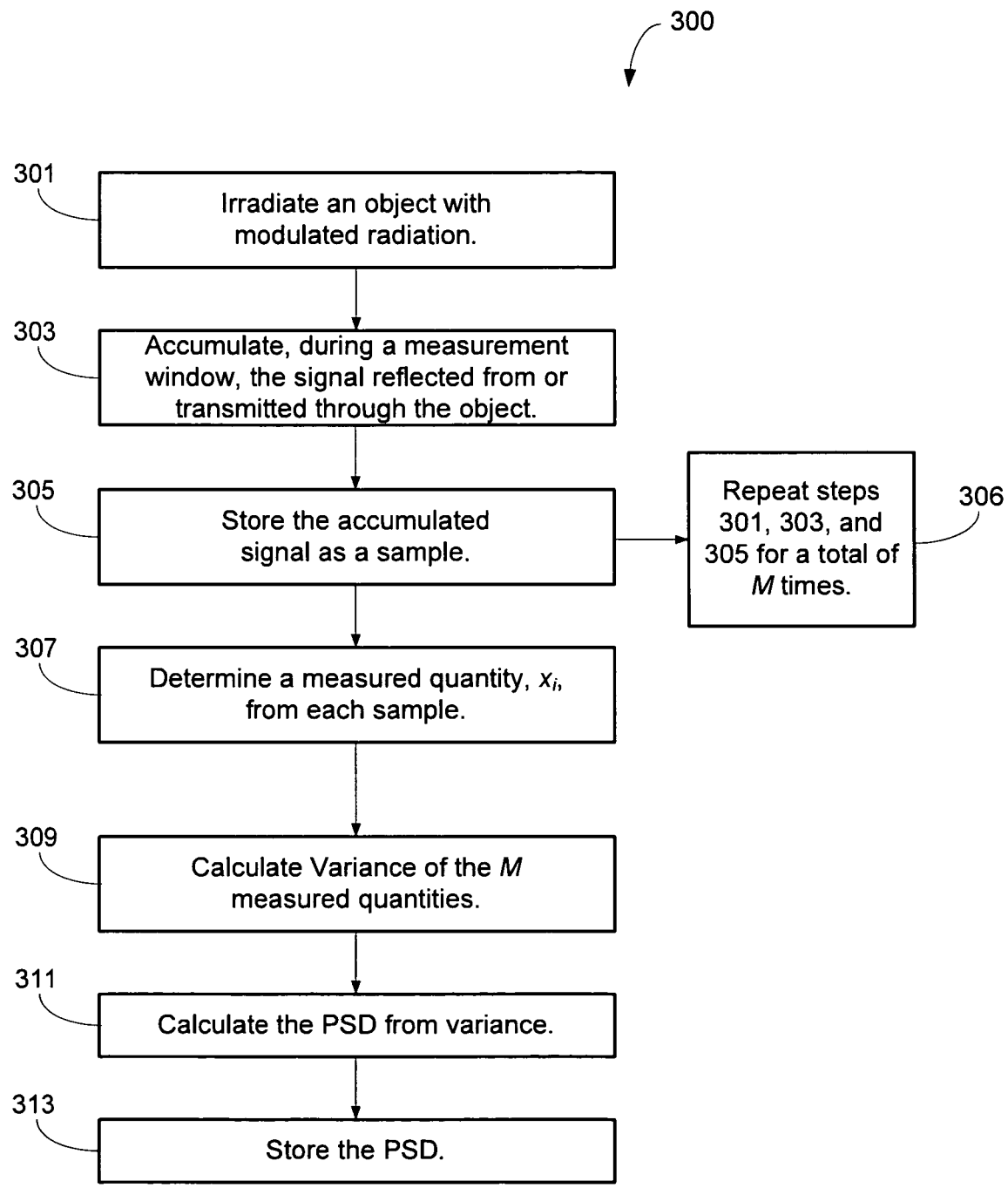
FIG. 3 is a flow chart illustrating a method for determining a power spectral density for a random process corresponding to activity of an object.

A method 300 for characterizing activity of an object is shown in FIG. 3. In some embodiments, the activity is governed by a wide-sense stationary random process. For example, the activity may the movement of a particle undergoing Brownian motion. As another example, the activity may be the flagellation of a lashlike appendage.

In step 301, the object is irradiated by intensity modulated radiation. The intensity of the radiation may vary sinusoidally at a frequency of interest. For example, the radiation intensity may vary according to Eq. 11.

In step 303, a signal reflected from, transmitted through, or radiated from (e.g., a fluorescent object) the object is accumulated during a measurement window. The measurement window may have a predetermined duration.

In step 305, the accumulated signal is stored as a sample. For example, the sample may be an image or a video frame. Any suitable storage medium and storage format may be used.

In step 306, steps 301, 303, and 305 are repeated for a total of M times (M>1). The measurement windows may be overlapping or non-overlapping. In some embodiments, each measurement window is of the same duration.

From each sample a measured quantity, $x_i$, is determined in step 307. The measured quantity may be determined in any suitable way.

If, for example, each sample is an image and the position of the object is the measured quantity of interest, a suitable algorithm may be used to identify the position of the object within the image. The position may, for example, be calculated as a distance from a center of a coordinate system, or a position along an axis. The position may be estimated for example, by analyzing the intensity profile of a single line of pixels passing through the object center. The target tracking module may bin (i.e., spatially integrate) several lines about the object center to form the single line used in analysis. A polynomial may be fit to the two minima corresponding to the one-dimensional "edges" of the object. As another example, the center of intensity in the image may be used.

In some embodiments, step 307 is performed immediately after storage of the accumulated signal as a sample in step 305. Step 307 may be performed for a sample at any suitable time after storage of the sample.

After all M measured quantities have been determined in step 307, in step 309 the variance of the measured quantities is determined. The variance may be determined according to Eq. 31.

In step 311 the power spectral density is determined at or near the frequencies of interest from the variance. The PSD may be estimated according to Eq. 20 using at least the variance, var[$X_m$], determined in step 309. In some embodiments, the power spectral density may be estimated from Eq. 29 or Eq. 30.

Information describing the modulation of the radiation irradiating the object (see step 301), and the variance of a set of measured values taken when the sensitivity is not modulated (i.e., the DC variance), may be used to determine the PSD.

In step 313, the PSD is stored. Any suitable storage device and format may be used. The PSD may be accessed for any purpose from the storage device. For example, the PSD may be displayed or used to estimate material properties of the object.

The process may be repeated, changing the frequency of interest at which the radiation is modulated. In some embodiments, repetitions of the method 300 for a set of frequencies of interest are interspersed amongst each other.

Figure 4:
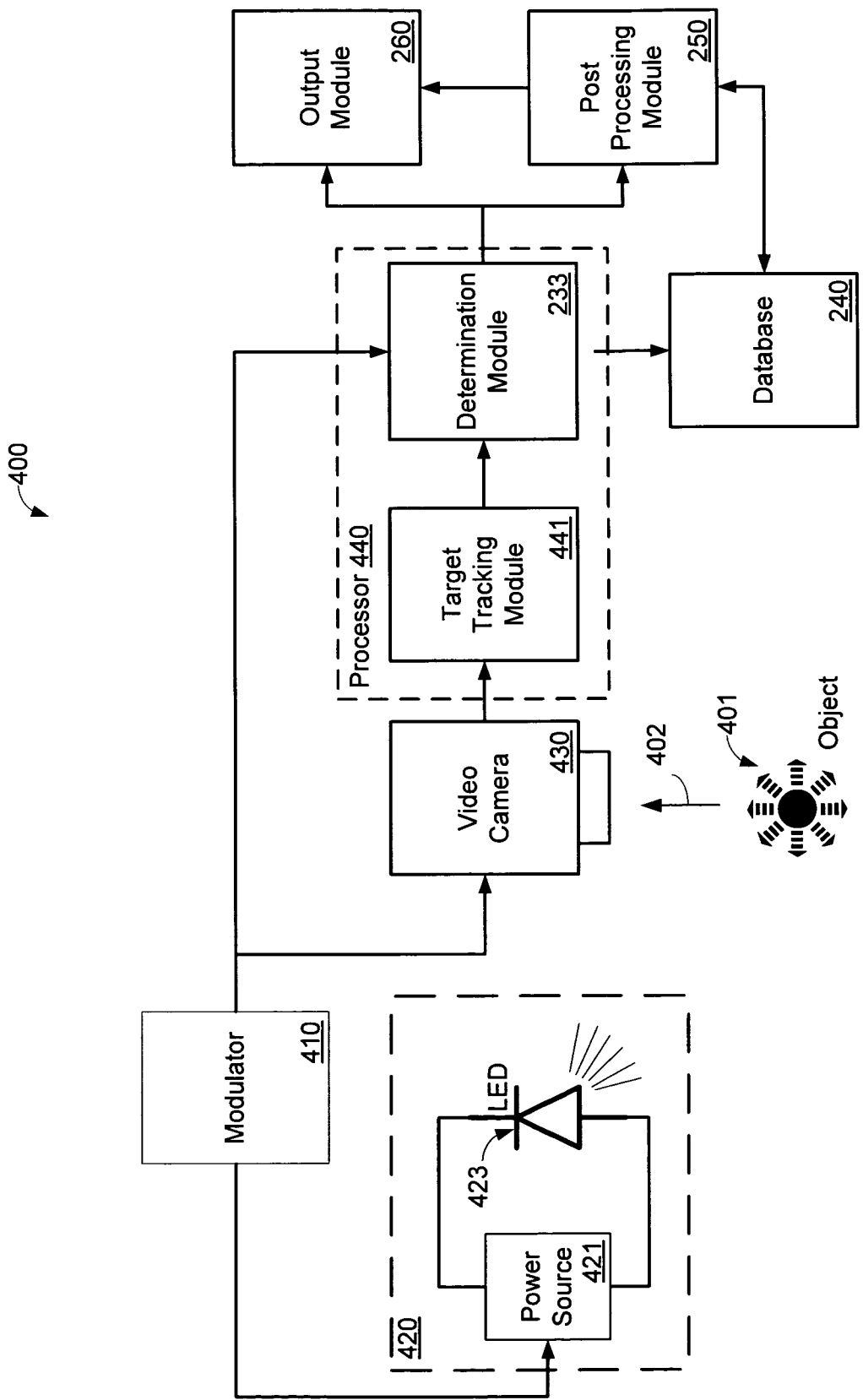
FIG. 4 is a block diagram of a measurement apparatus according to one embodiment of the present invention, in which a radiation source (e.g., light source) is modulated.

FIG. 4 is a block diagram of an apparatus 400 which may be employed for characterizing the activity of an object 401. Object 401 may have a quantity associated therewith that may be modeled as a wide-sense-stationary random process. For example, object 401 may be a bead confined to an optical trap whose position is a wide-sense-stationary random process.

Object 401 is irradiated by a radiation source 420. The radiation source 420 may have a power source 421 that drives a light emitting diode (LED) 423. LED 423 is an exemplary source of radiation and any suitable source may be used.

Generally, radiation source 420 may be modulated in any suitable way. In some embodiments (not shown), modulator 410 does not control the power source 421 of the radiation source 420. For example, radiation source 420 may emit polarized radiation and modulator may control the rotation of a polarizing screen such that the intensity of the radiation is modulated. As another example, radiation source 420 may be modulated independently, and modulator 410 may detect the modulation of the emitted radiation.

Modulator 410 may control the radiation source such that the intensity emitted radiation modulates at a modulation frequency. In some embodiments, the intensity of the emitted radiation is modulated sinusoidally in the form of L(t) (see Eq. 11). In some embodiments, the object 401 emits fluorescent radiation and radiation source 420 may provide high frequency (relative to the fluorescent radiation) photons at a modulated rate.

A video camera 430 captures an image of the object 401 irradiated by the radiation source 420 during a measurement window. The image of the object 401 is formed by collecting a modulated source signal 402 which may include radiation reflected from, transmitted through, or radiated from the object. The measurement window may take any suitable form. For example, the measurement window may be rectangular or other forms may be used (e.g., Gaussian shaped sensitivity). The image may be composed of numerous pixels, each assigned an intensity that represents the amount of the modulated source signal collected by the video camera 430 at the corresponding pixel position.

In some embodiments, the modulator 410 controls the phase relationship between the modulation of the radiation source and the measurement window. In some embodiments, the phase relationship is chosen according to Eq. 28.

The video camera 430 collects a number of images (i.e., video frames) of the object 401. Each image may be stored at least temporarily in a memory of the video camera 430. The images output for processing by processor 440. Processor 440 may include a target tracking module 441 and a determination module 233.

Target tracking module 441 may process the images (e.g., in real-time) to determine a quantity associated with the object 401 from each image. For example, the position of the object may be determined, or the shape of a flagellating appendage of the object 401 may be described (e.g., by Fourier coefficients). The tracking module outputs the set of quantities, $x_i$, (e.g., set of positions) to a determination module 233.

If the position of the object is to be determined from each image by the target tracking module 441, the position may be measured from a reference point, or as a position along one or more axes. The position may be determined in any suitable way. The position may be determined from the pixel values and pixel positions associated with an image. For example, determination of the position may be accomplished by analyzing the intensity profile of a single line of pixels passing through the center of the object 401. The target tracking module 441 may bin (i.e., spatially integrate) several lines about the center of the object to form the single line used in analysis. A polynomial may be fit to the two minima corresponding to the one-dimensional "edges" of the object. As another example, the center of intensity in the image may be used.

The determination module 233 may process the quantities in the same way as the determination module 233 of apparatus 200 (FIG. 2). Here, however, modulator 410 may provide information about the modulated signal to the determination module 233. Specifically, determination module 233 may determine the variance of the set of quantities (e.g., positions) received from the target tracking module 441 and the power spectral density of the process (e.g., a wide-sense stationary random process) at or near the modulation frequency based at least in part on the variance of the set of quantities.

Database 240, post-processing module 250, and output module 260 may also perform as described for apparatus 200 (FIG. 2).

In some embodiments of apparatus 400, the modulation provided by modulator 410 may have zero DC offset. For example, if the modulation portion is L(t), defined by Eq. 11, the DC offset is zero when B=0. This may be achieved using a "two color" technique whereby positive and negative radiation is simulated in a suitable way. For example, two different wavelengths (e.g., colors) or polarizations of radiation, modulated out of phase, may be imaged separately and subtracted by video camera 430. For low power measurements (e.g., light-limited measurements), each frame may be synchronized with one half-cycle of the radiation and sequential frames subtracted.

Figure 5:
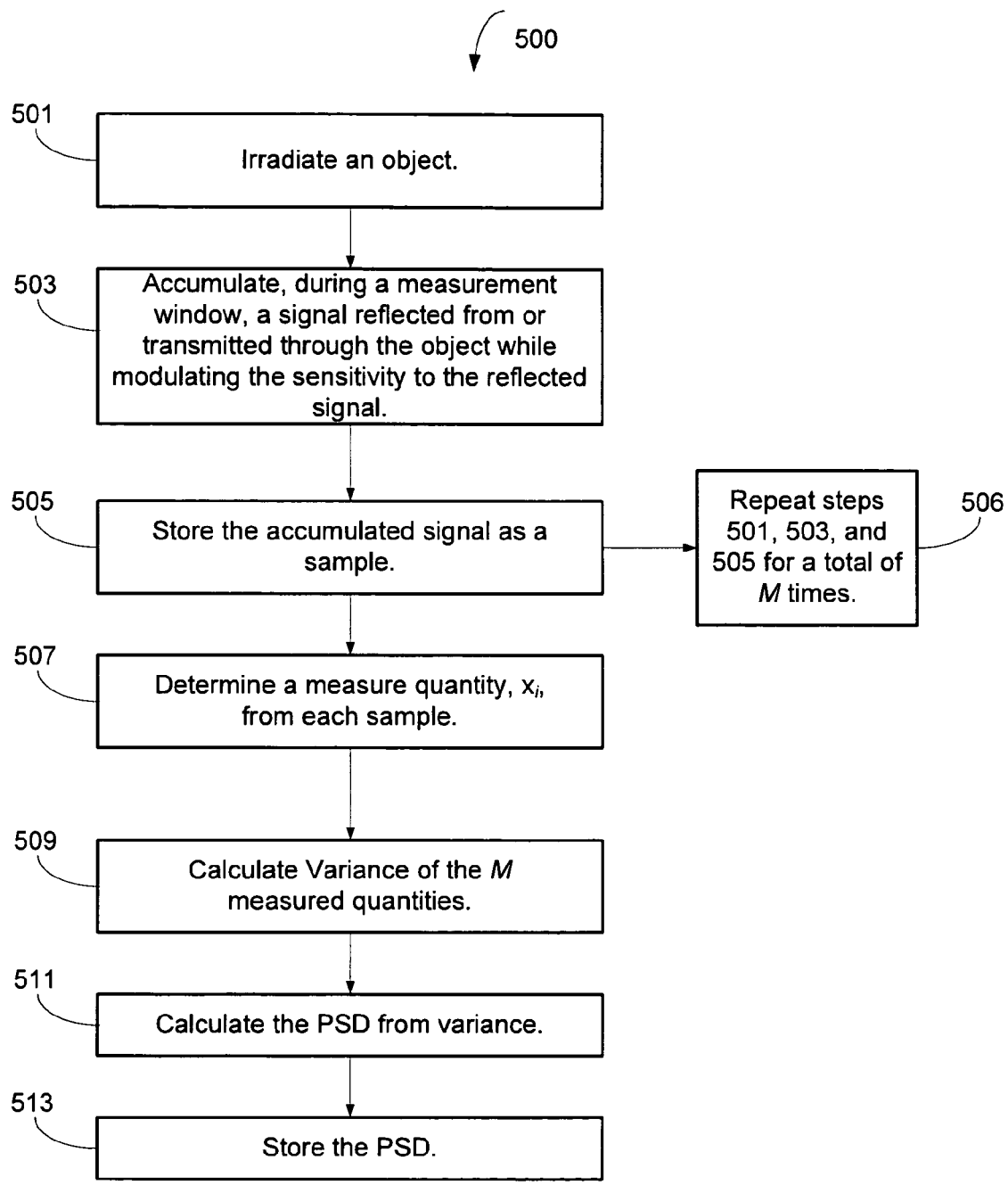
FIG. 5 is a flow chart illustrating a method for determining a power spectral density for a random process corresponding to activity of an object.

A method 500 for characterizing activity of an object is shown in FIG. 5. In some embodiments, the activity is governed by a wide-sense stationary random process. For example, the activity may the movement of a particle undergoing Brownian motion. As another example, the activity may be the flagellation of a lashlike appendage.

In step 501, the object is irradiated. For example, a light may be shined on the object.

In step 503, a signal reflected from, transmitted through, or radiated from the object is accumulated by a sensor (e.g., imaging sensor) during a measurement window. The measurement window may have a predetermined duration. During the measurement window, the sensitivity of the sensor to the reflected signal is modulated, for example, as discussed below in connection to FIG. 7a. The modulation may be performed at a frequency of interest.

The combined effect of the measurement window, during which the signal is accumulated, and the modulation of the sensor sensitivity may be modeled by Eq. 12. Specifically, in Eq. 12, X(t') represents the reflected signal, H(t−t') represents the measurement window, L(t−t') represents the modulation (see. Eq. 11), and the integral represents the accumulation.

In step 505, the accumulated signal (e.g., $X_m(t)$ in Eq. 12) is stored as a sample. For example, the sample may be an image or a video frame. Any suitable storage medium and storage format may be used.

In step 506, steps 501, 503, and 505 are repeated for a total of M times (M≥1). Before each measurement window, the sensor is reset such that any signal accumulated during previous measurement windows does not effect accumulation in the next measurement window. The measurement windows may be overlapping or non-overlapping. In some embodiments, each measurement window is of the same duration.

From each sample a measured quantity, $x_i$, is determined in step 507. The measured quantity may be determined in any suitable way. For example, the measured quantity may be a position of the object, or the flagellation of an appendage.

In some embodiments, step 507 is performed immediately after storage of the accumulated signal as a sample. Step 507 may be performed for a sample at any suitable time after storage of the sample.

After all M measured quantities have been determined in step 507, in step 509 the variance of the measured quantities is determined. The variance may be determined according to Eq. 31.

In step 511 the power spectral density is determined at or near the frequency of interest from the variance. The PSD may be estimated according to Eq. 20 using at least the variance, $var[X_m]$, determined in step 509. In some embodiments, the power spectral density may be estimated from Eq. 29 or Eq. 30.

Information describing the modulation of the sensor sensitivity (see step 503), and DC variancy, may be used to determine the PSD.

In step 513, the PSD is stored. Any suitable storage device and format may be used.

The process may be repeated, changing the frequency of interest at which the sensor sensitivity is modulated. In some embodiments, repetitions of the method 500 for a set of frequencies of interest are interspersed amongst each other.

Figure 6:
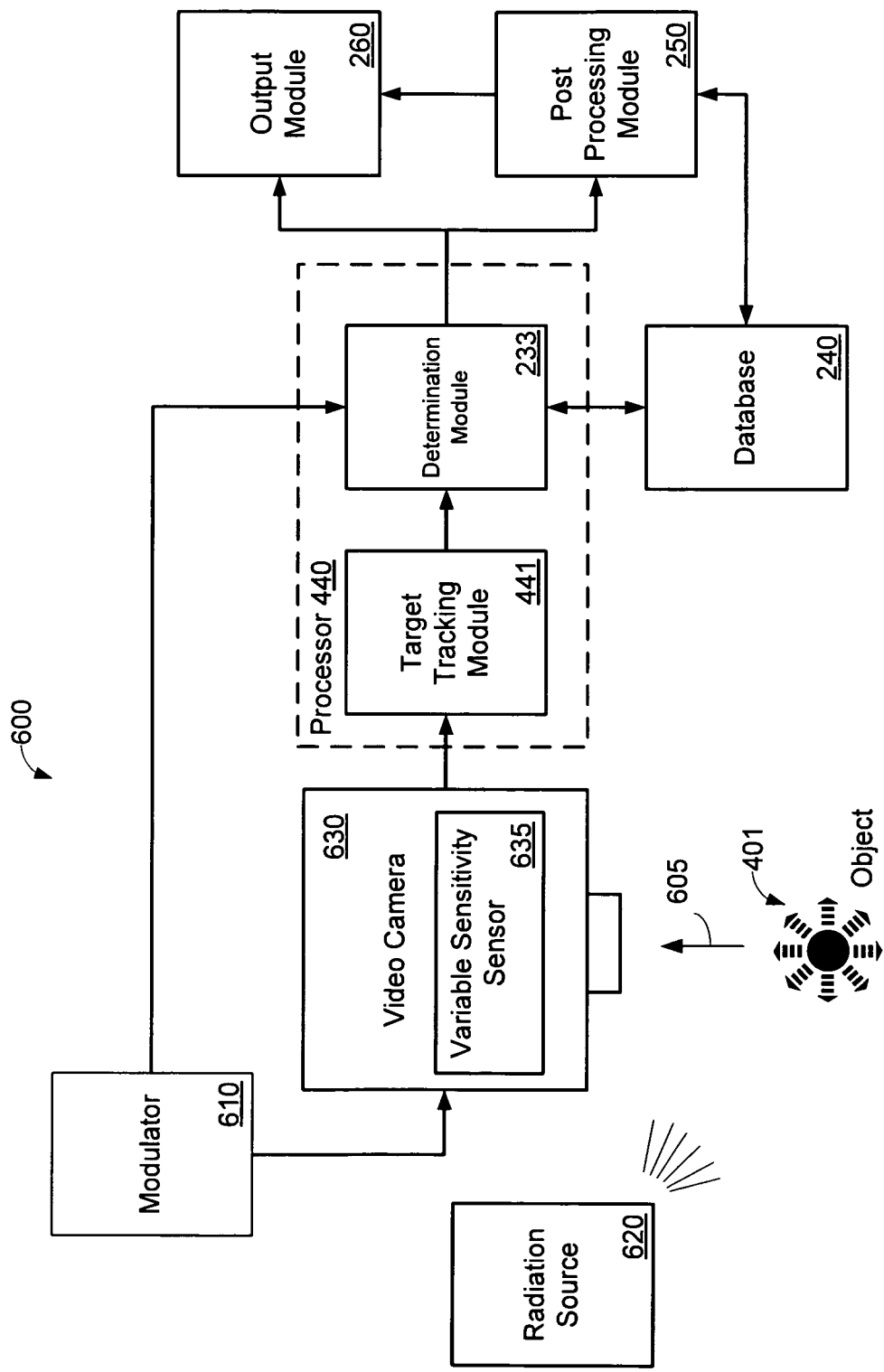
FIG. 6 is a block diagram of a measurement apparatus according to one embodiment of the present invention, in which a detector/sensor sensitivity is modulated.

FIG. 6 shows a block diagram of an apparatus 600 which may be employed for characterizing the activity of an object 401. In contrast to apparatus 400 (FIG. 4), the sensitivity of the video camera's sensor is modulated, rather than the radiation source. Video camera 630 has a variable sensitivity imaging sensor 635 to vary the sensor's sensitivity to the source signal 605 during a measurement window.

Any technique known in the art may be used to vary the sensitivity of the sensor 635. For example, a shutter may be repeatedly opened and closed during the measurement window. In some embodiments, the sensitivity of a photoactive region of the sensor may be controlled by a voltage or current.

Figure 7A:
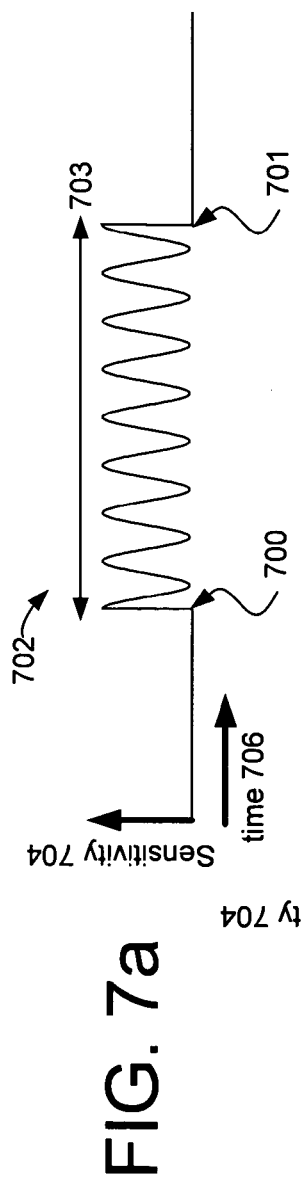
FIGS. 7a-d illustrate various modulation schemes, according to one embodiment, that may be employed in methods, apparatus and systems disclosed herein.

FIG. 7a illustrates an example of how the sensitivity of a sensor 635 may vary during a measurement window 702. At time 700 the measurement window 702 begins. Throughout the duration 703 of the measurement window 702 the sensitivity 704 of the sensor 635 oscillates sinusoidally as a function of time 706. In this example, the sensitivity 704 is oscillated eight times before time 701. More generally, however, the modulation frequency and measurement window duration may be chosen such that any number of cycles may be completed.

A suitable radiation source 620 may be used to irradiate object 401. Radiation source 620 may provide radiation of a constant intensity. In some embodiments, object 401 may emit radiation directly and radiation source 620 may be absent. In some embodiments, the object 401 emits fluorescent radiation and a radiation source 620 may provide high frequency (relative to the fluorescent radiation) photons.

A modulator 610 may be used to control the video camera 630 and the variable sensitivity sensor 635. The modulator 610, may control the measurement window and the modulation of the sensor 635. Generally, modulator 610 may define the impulse response, G(t), governing the acquisition of the source signal 605. In some embodiments, the modulator 610 provides a sinusoidal modulation signal, L(t), with modulation frequencies (see Eq. 11). The measurement window may be defined by the modulator 610 or the video camera 630.

After the completion of a measurement window the signal acquired by the sensor 635 is stored as an image. The image may be stored in any suitable format on any suitable storage medium. Video camera may include memory for at least temporarily storing the image.

The imaging process is repeated until a suitable number of images have been acquired. Each image may be captured using the same modulation frequency during measurement duration.

Processor 440 may process the images in the same way described for apparatus 400. Modulator 610 may provide information about the impulse response, G(t), (e.g., modulation frequency, phase, offset) to the determination module 233. Database 240, post processing module 250, and output module 260 may also perform as described for apparatus 200.

In some embodiments, each pixel of sensor 635 of video camera 630 comprises two collection wells. The intensity modulated signal is collected alternately by the first and second collection wells of each pixel. During the first half of each cycle of modulation (e.g., $0 \leq \omega't+\phi \leq \pi$, in Eq. 11), radiation is collected in the first well of each pixel, and during the second half of each cycle of modulation (e.g., $\pi \leq \omega't+\phi \leq 2\pi$, in Eq. 11), radiation is collected in the second well of each pixel. Thus, two images may be formed during a single measurement window and by subtracting the two images the DC offset (e.g., B in Eq. 11) may be removed.

3. Further Embodiments

Figure 7B:
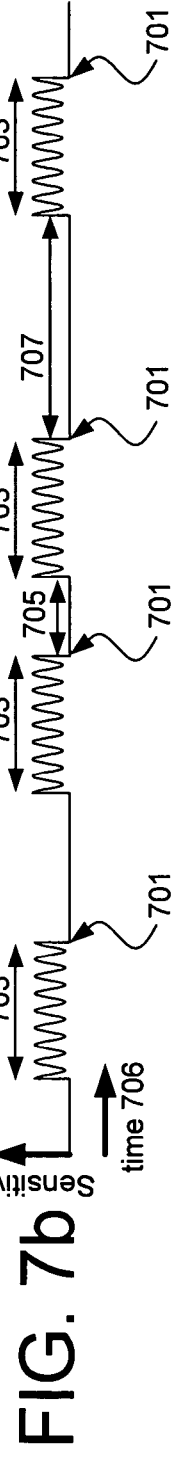

It should be appreciated that sampling may be performed periodically or aperiodically. If the sampling frequency is fixed, samples are taken at a fixed rate. If, however, the sampling rate is not fixed, samples may be taken at any suitable interval. FIG. 7b illustrates an irregular sampling interval for an embodiment where images are captured at the end of each measurement window, times 701. Each measurement window may be the same length 703, however, the spacing between frames may be irregular. For example, the spacing 705 is a much shorter time than the spacing 707.

Figure 7C:
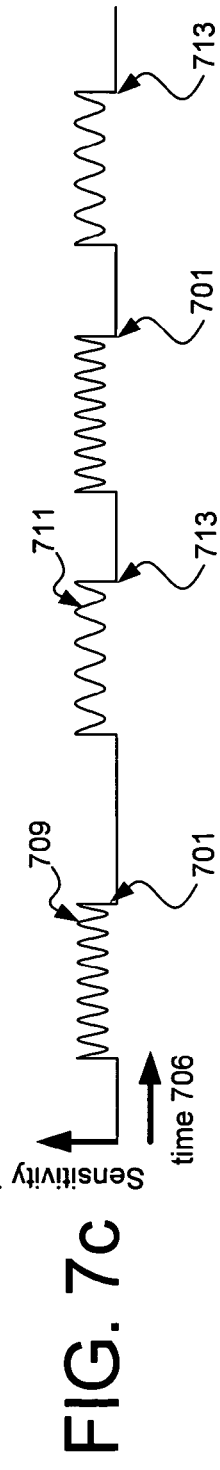

It should be appreciated that samples for each modulation need not be acquired in immediate succession to one another as they were in FIG. 7b. For example, samples at a modulation frequency 709 and a modulation frequency 711 may be intermingled as illustrated in FIG. 7c. The variance may be calculated separately for the measured quantities collected at times 701 (corresponding to modulation frequency 709) and the measured quantities collected at times 713 (corresponding to modulation frequency 711).

Figure 7D:
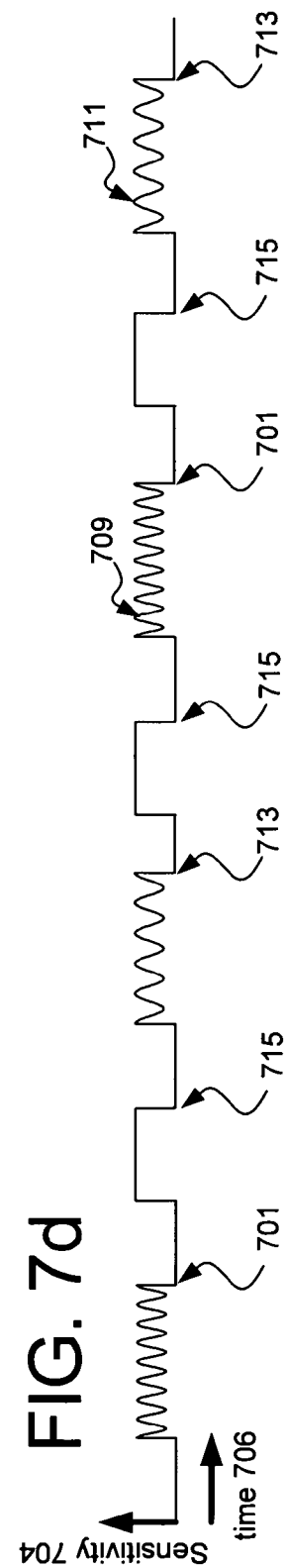

Samples may be intermingled for any number of modulation frequencies. FIG. 7d illustrates yet another example. Here a DC sample is taken at times 715 after samples at times 701 and times 713 corresponding to modulation frequencies 709 and 711, respectively.

While FIG. 7a-d were described with reference to modulating the sensitivity of an acquisition device, the same may be applied to any form for modulating the signal (e.g., modulating the radiation source). It is noted that the number of samples taken for each modulation frequency used to calculate the variance may be unique. That is, for each modulation frequency, the number of sample, M, may be chosen independently (see method 400, FIG. 1).

The number of samples collected, M, may be chosen dynamically. For example, M may be chosen when the variance of the first M−1 quantities is within a fixed amount (e.g., 1%) of the variance of the first M quantities. Consider method 100 (FIG. 1). An initial value of M may be chosen for step 105. The variance of the first M−1 quantities is calculated then the variance of all M samples is calculated. If the difference exceeds a threshold another sample (or set of samples) may be taken. The variance of the expanded set of quantities is determined and compared with the previous variance. The process may continue until the variance is deemed sufficiently stable to calculate the power spectral density (step 109).

The term wide-sense stationary random process is used to describe some of the processes that may be measured by the methods, apparatus, and systems herein. However, the frequency information of any suitable process may be characterized by these methods, apparatus, and systems.

The term wide-sense stationary random process is used in the practical or engineering sense. Strictly, the mathematical definition of a wide-sense stationary random process requires the mean and variance to be constant for all time. The engineering sense of the term, used throughout requires the mean and variance to be constant, within experimentally defined limits, over a time of interest. The time of interest may be, for example, the time during which experimental measurements are being taken.

For example, an object being tested may be heated by a radiation source or affected by changing room temperatures. This may cause a change in the power spectral density. Generally the error introduced by changing physical parameters may be ignored at sufficiently short time scales. This time scale places a limit on the duration of an experiment. Specifically, the measurement window duration, the number of samples taken, and the number of modulation frequencies used should be chosen based on this time scale.

In some embodiments, the observable (i.e., measured quantity) may not be wide-sense stationary. If the observable is sufficiently stable such that a sufficient number of samples may be taken to estimate the variance and PSD before the PSD has significantly changed, the PSD may be tracked. For example, the last M samples may be used to estimate the current PSD. After each new measurement, the oldest measurement is replaced, and the PSD is again estimated. In this way the PSD may be tracked over time at one or more frequencies.

In some embodiments, multiple sensors/detectors may be used such that the PSD may be determined simultaneously at multiple frequencies of interest. For example, multiple instances of apparatus 600.

The power spectral density at a frequency of interest has generally been found using the measured variance at the frequency of interest, properties of the modulation, and the DC variance. However, use of the DC variance is simply one example of how the power spectral density at the frequency of interest may be found. Any suitable information may be used with the measured variance at the frequency of interest to find the power spectral density. For example, the power spectral density at the frequency of interest may be found using the variance measured at a second frequency at which the power spectral density is known to be near zero (e.g., a sufficiently high frequency in the case of an optically trapped bead). Generally, if the power spectral density is known at a first frequency, and the variance is known at a second frequency, the power spectral density may also be found at the second frequency.

4. Exemplary Measurement Using Intensity Modulated Spectral Analysis (IMSA)

Figure 8:
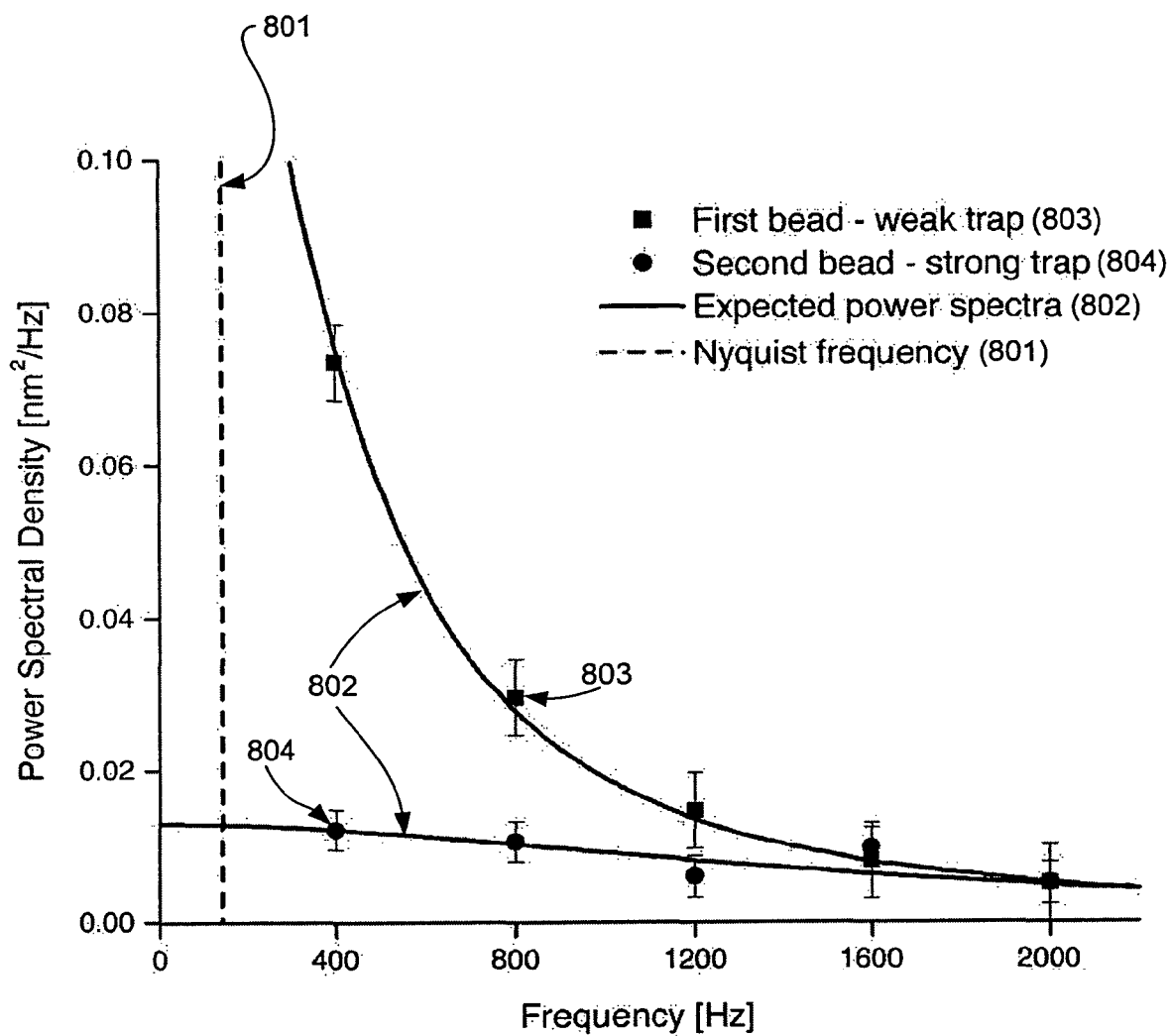
FIG. 8 is an example plot of power spectral density obtained via methods, apparatus and systems according to various embodiments disclosed herein.

IMSA has been demonstrated to overcome previous limitations of video camera frame rate and photo-emission rate, extending the observable dynamic range of and significantly reducing the investment required to make high-frequency power spectral density measurements. FIG. 8 is a plot of measurements of the power spectral density (in nanometers squared per Hertz, $nm^2/Hz$) for two trapped beads with different spring constants. Measurements for a weak trap 803 are shown as squares, while measurements for a strong trap 804 are shown as circles. The power spectral density expected from theoretical models are superimposed as solid lines 802, showing good agreement well beyond the Nyquist frequency (vertical dashed line 801). Error bars are plotted as statistical error.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    A) modulating a first signal at a first modulation frequency to provide a modulated first signal;
    B) measuring the modulated first signal during a plurality of measurement windows to obtain a corresponding plurality of samples of the modulated first signal so as to generate a set of quantities associated with the first signal;
    C) determining at least one value of a power spectral density (PSD) for the first signal at or near the first modulation frequency based at least in part on B); and
    D) repeating A), B), and C) at at least one second modulation frequency,
    wherein A) comprises:
        A1) modulating the first signal at the first modulation frequency only during a first subset of the plurality of measurement windows; and
        A2) modulating the first signal at the at least one second modulation frequency only during at least one second subset of the plurality of measurement windows,
    wherein the first subset of the plurality of measurement windows and the at least one second subset of the plurality of measurement windows are interleaved.

2. The method of claim 1, wherein the measurement windows occur in an alternating fashion such that each window of the first subset is followed successively by one window of the at least one second subset.

3. A system for characterizing an activity of an object, the activity constituting a wide-sense stationary random process, the system comprising:
    a radiation source to irradiate the object with first radiation during the activity so as to provide a first signal representing the wide-sense stationary random process, the first signal including second radiation from the object resulting from irradiation of the object by the first radiation;
    a video camera to detect at least a portion of the second radiation during a plurality of measurement windows, the video camera thereby acquiring and storing a corresponding first plurality of images of the object during the activity, wherein each image of the first plurality of images represents a sample of the first signal and includes a plurality of pixel values corresponding to the detected second radiation;
    a modulator to modulate the first signal at a first modulation frequency prior to the video camera storing the first plurality of images; and
    at least one processor coupled to the video camera to process the first plurality of images so as to generate a set of positions of the object during the activity, the processor determining one position of the set of positions for each image of the first plurality of images based at least in part on the plurality of pixel values for the image, the processor further determining a variance of the set of positions and at least one value of a power spectral density (PSD) for the wide-sense stationary random process at or near the first modulation frequency based at least in part on the variance of the set of positions, wherein the video camera is configured to acquire and store a second plurality of images of the object during the activity;

wherein the modulator is configured to modulate the first signal at a second modulation frequency prior to the video camera storing the second plurality of images; and wherein the at least one processor is configured to process the second plurality of images so as to generate a second set of positions of the object during the activity, the processor determining one position of the second set of positions for each image of the second plurality of images based at least in part on the plurality of pixel values for the image, the processor further determining a second variance of the second set of positions and at least one second value of the power spectral density (PSD) for the wide sense stationary random process at or near the second modulation frequency based at least in part on the second variance of the second set of positions, wherein the modulator is configured to:
modulate the first signal at the first modulation frequency only during a first subset of the plurality of measurement windows; and
modulate the first signal at the second modulation frequency only during a second subset of the plurality of measurement windows, wherein the first subset of the plurality of measurement windows and the second subset of the plurality of measurement windows are interleaved.

4. The system of claim 3, wherein the measurement windows occur in an alternating fashion such that each window of the first subset is followed successively by one window of the second subset.

* * * * *